(12) United States Patent
Rivera (10) Patent No.: US 8,621,777 B2
(45) Date of Patent: Jan. 7, 2014

(54) LOW COST DISPOSABLE CONTAINER FOR USE WITH ELECTRONIC PEST ELECTROCUTION DEVICE

(76) Inventor: Adrian Rivera, Whittier, CA (US)

(*) Notice: Subject to any disclaimer, the term of this patent is extended or adjusted under 35 U.S.C. 154(b) by 914 days.

(21) Appl. No.: 12/406,452

(22) Filed: Mar. 18, 2009

(65) Prior Publication Data

US 2010/0236132 A1  Sep. 23, 2010

(51) Int. Cl.
*A01M 23/38* (2006.01)

(52) U.S. Cl.
USPC .................................................... 43/98

(58) Field of Classification Search
USPC ......................................... 43/58, 98, 99, 124
See application file for complete search history.

(56) References Cited

U.S. PATENT DOCUMENTS

| | | | | |
|---|---|---|---|---|
| 2,581,327 A * | 1/1952 | Knox | ................ | 43/82 |
| 2,707,745 A * | 5/1955 | Farr et al. | ............. | 392/376 |
| 2,995,862 A * | 8/1961 | Pimentel | ............ | 43/99 |
| 3,197,916 A * | 8/1965 | Cole, Jr. et al. | .......... | 43/66 |
| 3,343,744 A * | 9/1967 | Morell et al. | ............. | 229/149 |
| 4,074,456 A * | 2/1978 | Tidwell | ............ | 43/98 |
| 4,497,130 A * | 2/1985 | Fitzgerald | ............ | 43/98 |
| 4,780,985 A * | 11/1988 | Coots | ................ | 43/98 |
| 5,269,091 A | 12/1993 | Johnson | | |
| 5,369,907 A * | 12/1994 | Lee | ............... | 43/98 |
| 5,949,636 A | 9/1999 | Johnson | | |
| 6,009,662 A * | 1/2000 | Chang | ............. | 43/112 |
| 6,993,867 B2 | 2/2006 | Toyota | | |
| 7,530,195 B2 * | 5/2009 | Muller et al. | ............ | 43/98 |
| 2005/0284015 A1 * | 12/2005 | Greisman | ............ | 43/60 |
| 2008/0216387 A1 | 9/2008 | Peters | | |
| 2012/0285075 A1 * | 11/2012 | Lubic et al. | ............ | 43/60 |

FOREIGN PATENT DOCUMENTS

| | | | | |
|---|---|---|---|---|
| FR | 2689371 A1 * | 10/1993 | ............ | A01M 23/38 |
| JP | 2007-167009 | 7/2007 | | |
| JP | 2007-167009 A | 7/2007 | | |
| JP | 2007-195507 | 8/2007 | | |
| JP | 2007-195507 A | 8/2007 | | |

* cited by examiner

*Primary Examiner* — Kimberly Berona
*Assistant Examiner* — Danielle Clerkley
(74) *Attorney, Agent, or Firm* — Kenneth L. Green

(57) ABSTRACT

A method and apparatus for electrocution and disposal of pests includes a reusable power source and a low cost disposable container. The reusable power source includes batteries and a circuit to provide a high voltage and low current signal through external leads to the disposable container, to electrocute small pests without presenting a risk to humans or pets. The disposable container is constructed from low cost material, for example, cardboard, and may be packaged for sale in a flat foldable state, and easily configured into a container with a floor including conducting surfaces connected to the external leads. In one embodiment, the conducting surfaces are formed of a conducting material formed or glued on the floor of the disposable container and the conducting material further forms internal leads reaching to a male connector surface configured to cooperate with a female connector of the external leads.

23 Claims, 9 Drawing Sheets

LOW COST DISPOSABLE CONTAINER FOR USE WITH ELECTRONIC PEST ELECTROCUTION DEVICE

BACKGROUND OF THE INVENTION

The present invention relates to pest management and in particular to a low cost disposable container for containing and disposing of an electrocuted pest.

Pests such as rodents present both a nuisance and a heath risk at residences, farms, ranches, and recreational areas. Additionally, urban areas, factories, restaurants, etc. often face rodent infestations. Various mechanical traps are available but generally include some type of grasping mechanism which may be difficult to set and cause discomfort or injury if released on a user's hand. Poisons are also commonly used, but may create their own health risks. For these and other reasons, users are often reluctant to use traditional measures.

U.S. Pat. Nos. 5,269,091 and 5,949,636 disclose portable pest electrocution devices which overcome some of the issues present in mechanical traps and poisons. The '091 and '636 patents describe electrical circuits for sensing the presence of a pest and creating a high voltage signal to electrocute the pest. Unfortunately, both devices require removal of dead pests from the device for disposal. Such removal may involve accidental contact with the dead pest, or an unpleasant experience. Pests are also known to carry diseases, and contact with them may present a heath risk. The '091 and '636 patents are incorporated herein by reference.

BRIEF SUMMARY OF THE INVENTION

The present invention addresses the above and other needs by providing a method and apparatus for electrocution and disposal of pests which includes a reusable power source and a low cost disposable container. The reusable power source includes batteries and a circuit to provide a high voltage and low current signal through external leads to the disposable container, to electrocute small pests without presenting a risk to humans or pets. The disposable container is constructed from low cost material, for example, cardboard, and may be packaged for sale in a flat foldable state, and easily configured into a container with a floor including conducting surfaces connected to the external leads. In one embodiment, the conducting surfaces are formed of a conducting material formed or glued on the floor of the disposable container and the conducting material further forms internal leads reaching to a male connector surface configured to cooperate with a female connector of the external leads.

In accordance with one aspect of the invention, there is provided a method for electrocution and disposal of pests. The method includes providing a power source providing a high voltage and low current signal for electrocution of the pests without presenting risks to humans and a low cost disposable container. Leads are connected from the power source to the low cost disposable container, the leads having a female connector and the low cost disposable container having a male connector. The power supply is switched on and the user waits for a pest to be electrocuted. After the pest has been electrocuted, the power supply is switch OFF and the leads are disconnected from the low cost disposable container. The low cost disposable container containing the electrocuted pest is then disposed of without requiring handling the dead pest.

In accordance with another of the invention, there is provided a low cost disposable container disconnectably connectable to a high voltage and low current power source. The low cost disposable container is foldable to a flat form for packaging and configurable into a container for use. The low cost disposable container includes conducting areas for making contact with the pest to electrocute the pest, and in one embodiment, to sense the presence of the pest. The container contacts and extensions connecting the conducting areas to the container contacts are preferably integrally formed as a thin layer of electrically conductive material glued to the interior of the low cost disposable container or formed on the interior of the low cost disposable container. The interior of the low cost disposable container may be formed from a cutout of a flat sheet and is preferably formed from plastic or a paper product and more preferably from a paper product. The low cost disposable container may thus be disposed of after each use.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
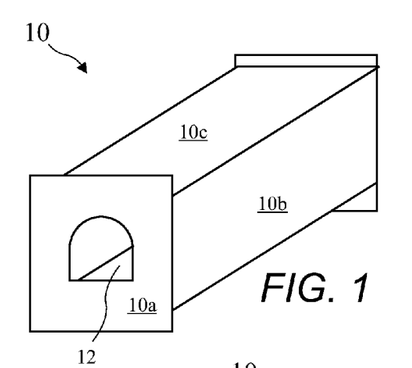
FIG. 1 is a perspective view of a low cost disposable container according to the present invention.
Figure 2A:
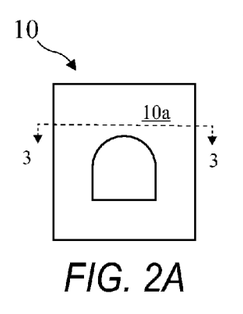
FIG. 2A is a front view of the low cost disposable container.
Figure 2B:
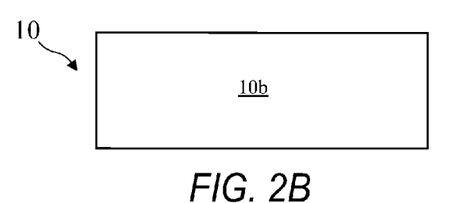
FIG. 2B is a side view of the low cost disposable container.
Figure 2C:
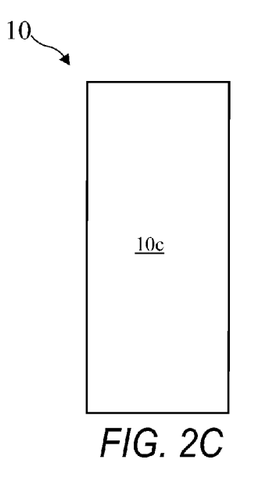
FIG. 2C is a top view of the low cost disposable container.
Figure 2D:
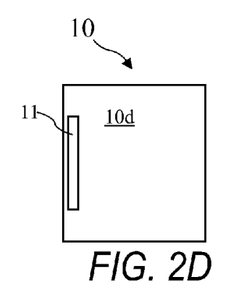
FIG. 2D is a rear view of the low cost disposable container.

A perspective view of a low cost disposable container 10 according to the present invention is shown in FIG. 1, a front view of the low cost disposable container 10 showing the front 10a of the low cost disposable container 10 is shown in FIG. 2A, a side view of the low cost disposable container 10 showing the right side 10b of the low cost disposable container 10 is shown in FIG. 2B, a top view of the low cost disposable container 10 showing the top 10c of the low cost disposable container 10 is shown in FIG. 2C, and a rear view of the low cost disposable container 10 showing the rear 10d of the low cost disposable container 10 is shown in FIG. 2D. The low cost disposable container 10 is connected to a power source 30 (see FIG. 6) to provide apparatus for electrocuting pests, and in particular, small rodents. The low cost disposable container 10 thus has walls comprising the front 10a, the right side 10b, the top 10c, the rear 10d, the floor 10e, and the left side 10f (not shown).

The low cost disposable container 10 is preferably constructed from plastic or a paper product and more preferably from a paper product, and may be folded into a flat folded form for packaging for sale. Paper construction is preferred over plastic because rodents are often more comfortable around paper products and odors released by plastics may repel rodents. In the instance of either material, the electric quality of the container 10 is preferably provided by applying a conductive material to the paper or plastic material used to construct the container.

The low cost disposable container 10 includes an entry 12 in the front 10a allowing pests to enter the low cost disposable container 10. The rear 10d includes a passage 11 allowing insertion of a connector 36 (see FIG. 6). The connector 36 includes spaced apart connector contacts 40a-40c (see FIG. 8) which electrically connect with spaced apart container contacts 24a-24c to electrically connect the power source 30 to the low cost disposable container 10.

Figure 3:
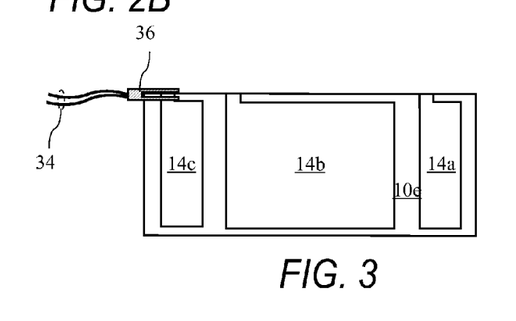
FIG. 3 is a cross-sectional view of the low cost disposable container taken along line 3-3 of FIG. 2A.

A cross-sectional view of the low cost disposable container 10 taken along line 3-3 of FIG. 2A is shown in FIG. 3. Three conducting areas 14a, 14b, and 14c reside on a floor 10e of the low cost disposable container 10. The conducting areas 14a, 14b, and 14c are preferably a metal foil glued to the floor 10e or a coating deposited on the floor 10e. Each of the conducting areas 14a, 14b, and 14c is preferably connected to the power source 30 by separate electrical connections and cooperate with the power source 30 to provide sensing and electrocution functions. The power source 30 senses the resistance between the first conducting area 14a and second conducting area 14 to sense the presence of a pest in the low cost disposable container 10. Once the presence of the pest is sensed, a high voltage and low current signal is connected between the first and second conducting areas 14a and 14b, and between the second and third conducting areas 14b and 14c, thereby electrocuting the pest when the pest contacts both the first and second conducting areas 14a and 14b or contacts both the second and third conducting areas 14b and 14c. Leads 34 and a female connector 36 disconnectably electrically connect to electrical contacts 24a-24c (see FIG 4a). residing on an interior surface of the low cost disposable container 10. A lip 44b (see FIG, 7A) enters the low cost disposable container 10 through the passage 11 and lip 44a and the lip 44b sandwich the side 10b to form the electrically connection between the electrical contacts 24a-24c and contacts 40a-40c (see FIG. 8) on the lip 44b.

Figure 4A:
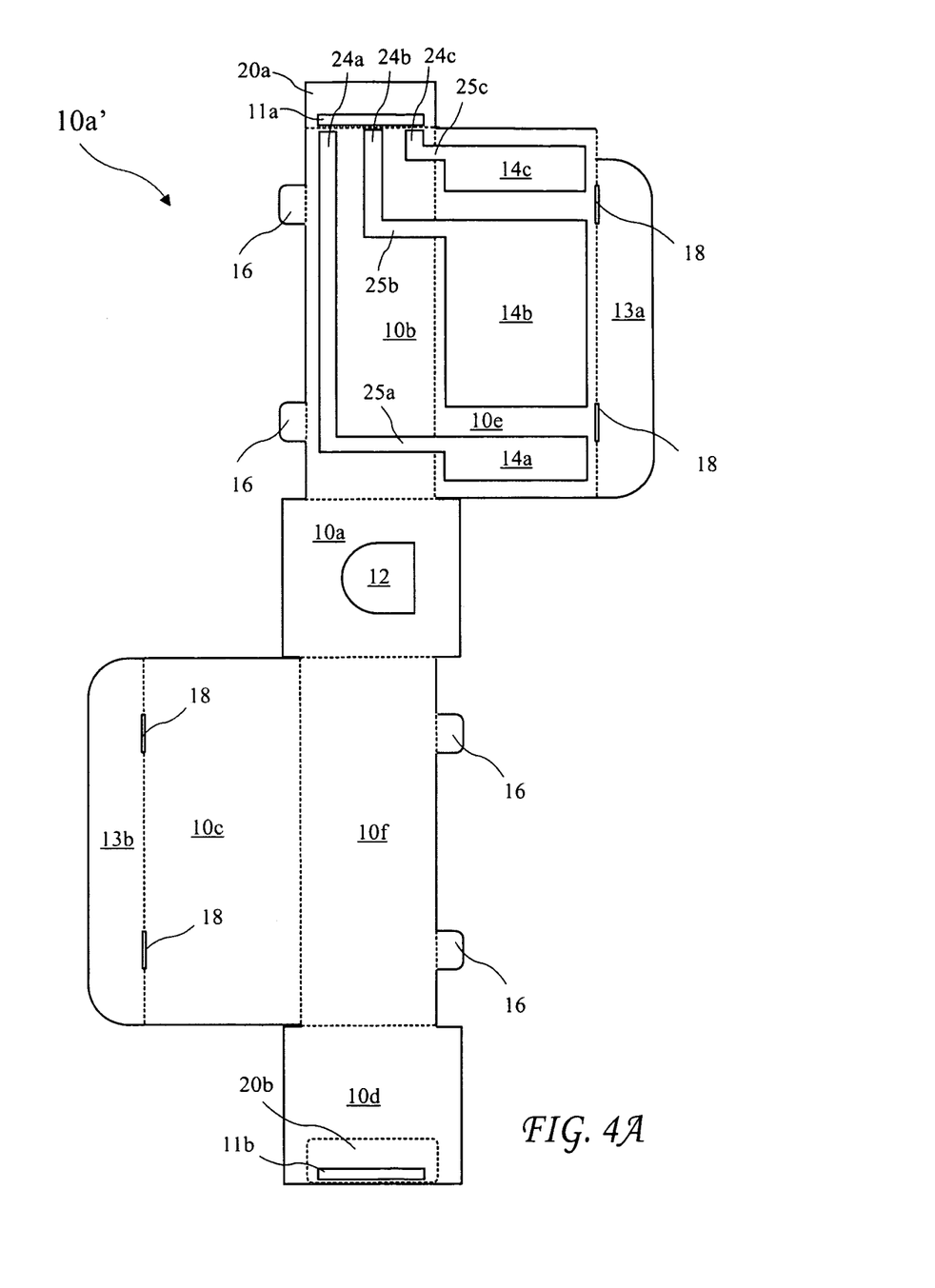
FIG. 4A shows a cutout according to the present invention suitable for construction of the low cost disposable container.

A cutout 10a' according to the present invention suitable for construction of the low cost disposable container 10 is shown in FIG. 4A. The cutout 10a' may be cut out from any flat sheet, and is preferably cut out from a paper product or a plastic, and more preferably cut out from a paper product. The cutout 10a' includes a bonding tab 20a and a bonding area 20b for bonding to form a closed flat folded form 10'' (see FIGS. 5A and 5B). The cutout 10a' further includes tabs 16 and cuts 18 which cooperate for configuring the flat folded form 10'' into the low cost disposable container 10.

Figure 8:
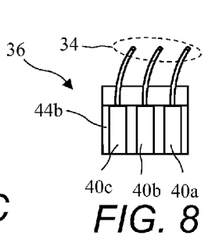
FIG. 8 is a cross-sectional view of the female connector according to the present invention taken along line 7-7 of FIG. 7B.

The conducting areas 14a, 14b, and 14c are highlighted by shading in FIG. 4, and extensions (or conducting paths) 25a, 25b, and 25c of the conducting areas 14a, 14b, and 14c electrically connect the conducting areas 14a, 14b, and 14c to spaced apart container contacts 24a, 24b, and 24c provided to make electrical contact with the spaced apart lead contacts 40a, 40b, and 40c (see FIG. 8). The extensions 25a, 25b, and 25c may be any electrically conductive structure, for example, wire leads, or conductive material glued or formed on the cutout 10', but are preferably conductive material glued or formed on the cutout 10', and more preferably, the conducting areas 14a, 14b, and 14c, the extensions 25a, 25b, and 25c, and the spaced apart lead contacts 40a, 40b, and 40c are all glued or formed as a single step and are continuous layer of conductive material glued or formed as a single step. For example, the conducting areas 14a, 14b, and 14c, the extensions 25a, 25b, and 25c, and the spaced apart lead contacts 40a, 40b, and 40c may all be a metal (for example aluminum) glued onto the cutout 10a'. The spaced apart container contacts 24a, 24b, and 24c may alternatively be connected to the conducting areas 14a, 14b, and 14c by wire leads, but at greater manufacturing cost.

Figure 4B:
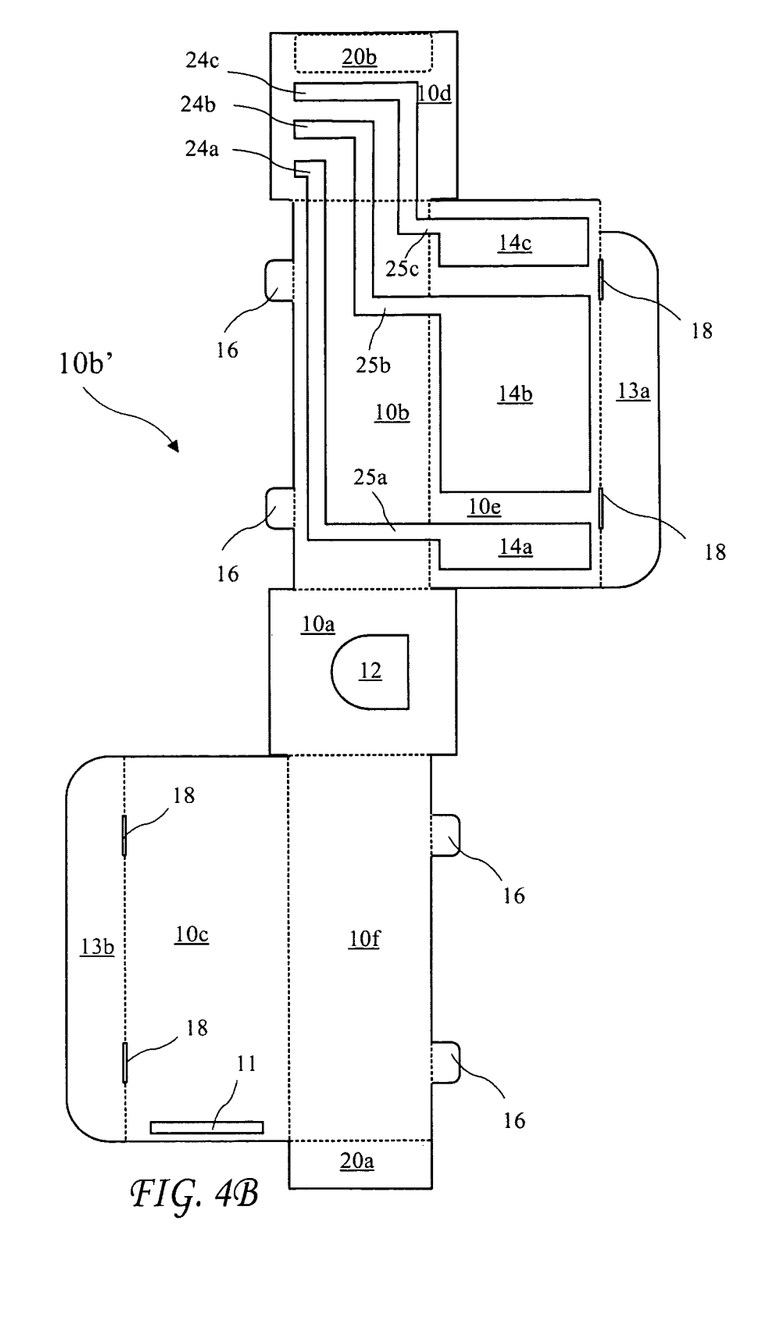
FIG. 4B shows a second cutout according to the present invention suitable for construction of the low cost disposable container.

A second cutout 10b' according to the present invention suitable for construction of the low cost disposable container is shown in FIG. 4B. The cutout 10b' is similar to the cutout 10a' (see FIG. 4A) except that the spaced apart container contacts 24a, 24b, and 24c reside on the end 10d.

Figure 4C:
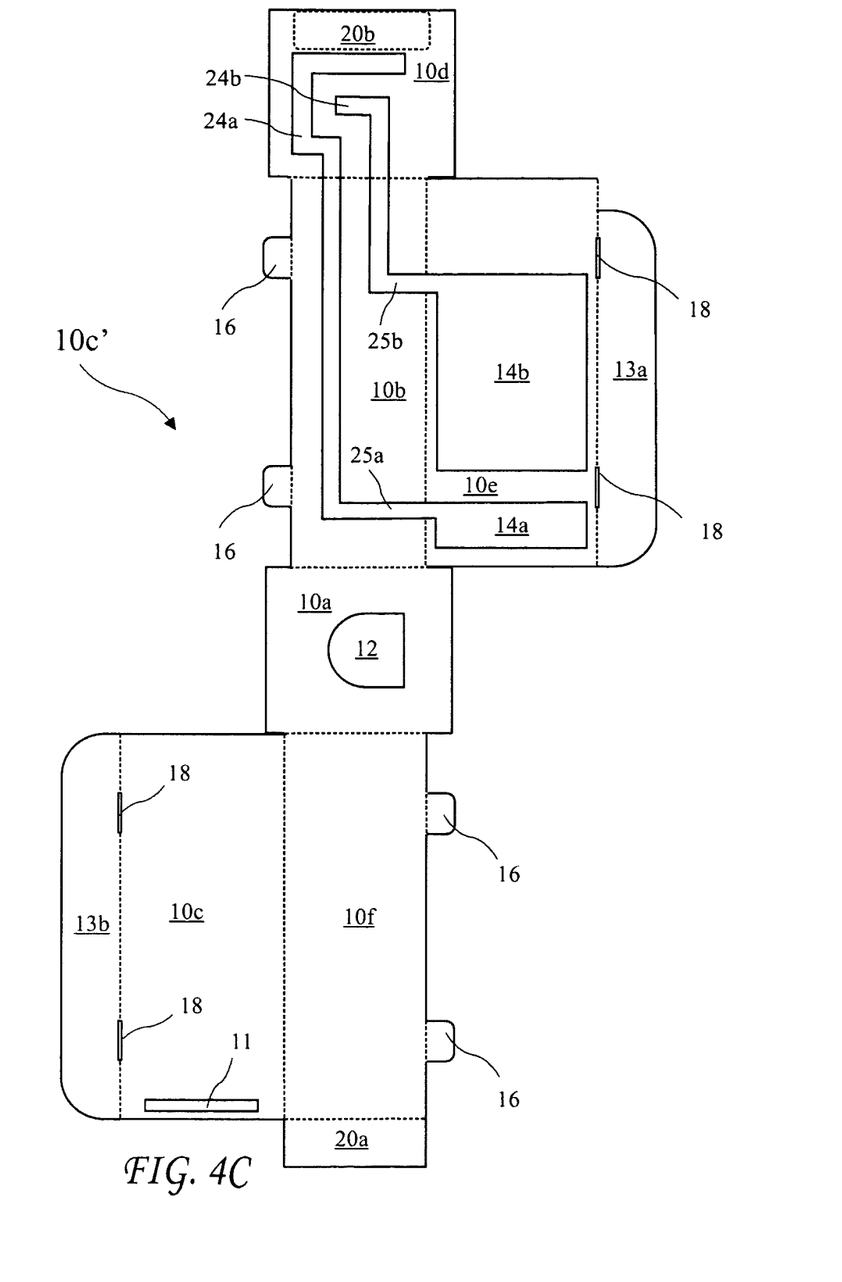
FIG. 4C shows a third cutout according to the present invention suitable for construction of the low cost disposable container.

A third cutout 10c' according to the present invention suitable for construction of the low cost disposable container is shown in FIG. 4C. The cutout 10c' is similar to the cutout 10a' (see FIG. 4A) except that the conducting area 14c, the extensions 25c, and the container contact and 24c eliminated, and the remaining spaced apart container contacts 24a and 24b reside on the end 10d.

Figure 4D:
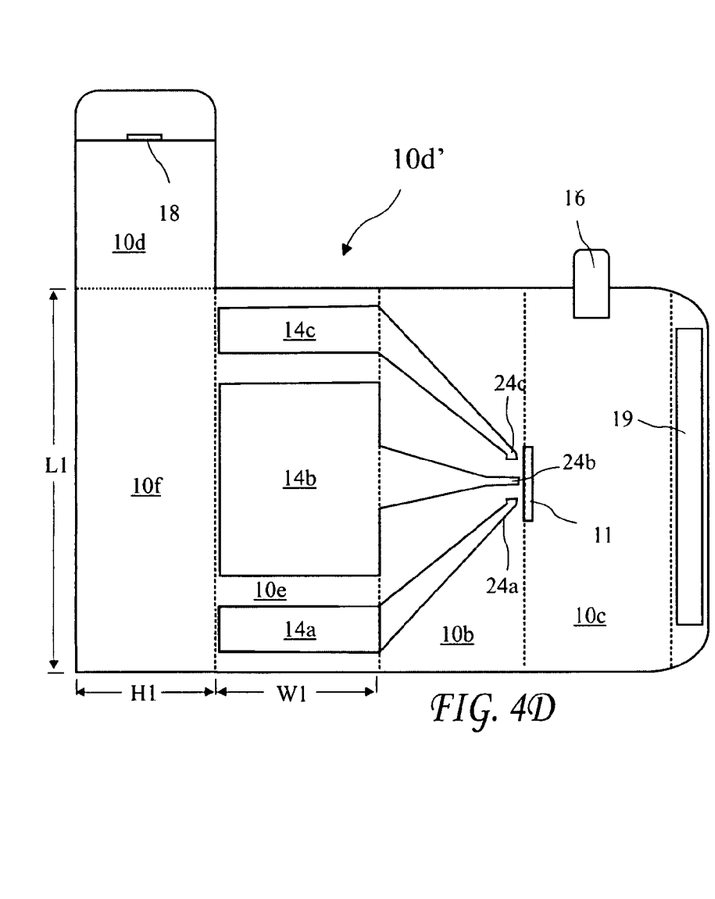
FIG. 4D shows a fourth cutout according to the present invention suitable for construction of the low cost disposable container for a large rodent.

A fourth cutout 10d' according to the present invention suitable for construction of the low cost disposable container for a large rodent is shown in FIG. 4D. The cutout 10d' includes tab 16 for engaging slot 18, and adhesive 19 for attachment to form the low cost disposable container. The mouth 11 is on the top surface 10c the container. The container 10d' has a length L1, a width W1, and a height H1. The length L1 is preferably approximately 210 mm, the width W1 is preferably 93 mm, and the height H1 is preferably approximately 80 mm.

Figure 4E:
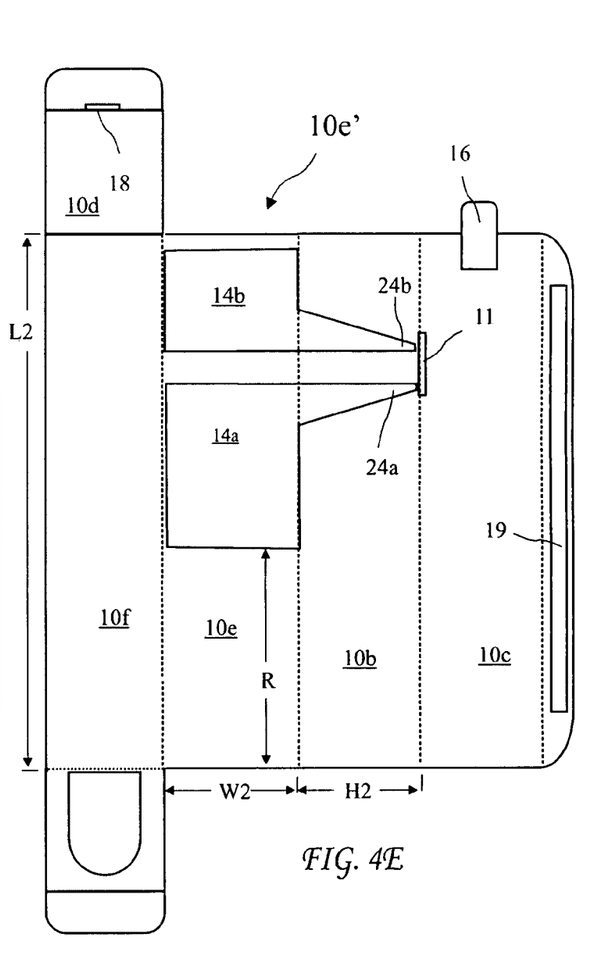
FIG. 4E shows a fifth cutout according to the present invention suitable for construction of the low cost disposable container for a small rodent.

A fifth cutout 10e' according to the present invention suitable for construction of the low cost disposable container for a small rodent is shown in FIG. 4E. The cutout 10e' includes tab 16 for engaging slot 18, and adhesive 19 for attachment to form the low cost disposable container. The mouth 11 is on the top surface 10c the container. The container 10e' has a length L2, a width W2, and a height H2. The length L2 is preferably approximately 156 mm, the width W2 is preferably 45 mm, and the height H2 is preferably approximately 40 mm. The conducting areas 14a and 14b are recessed approximately a distance R from the entry to prevent or resist a user making contact with the conducting areas 14a and 14b and being shocked. The recess R is preferably approximately 70 mm.

Figure 5A:
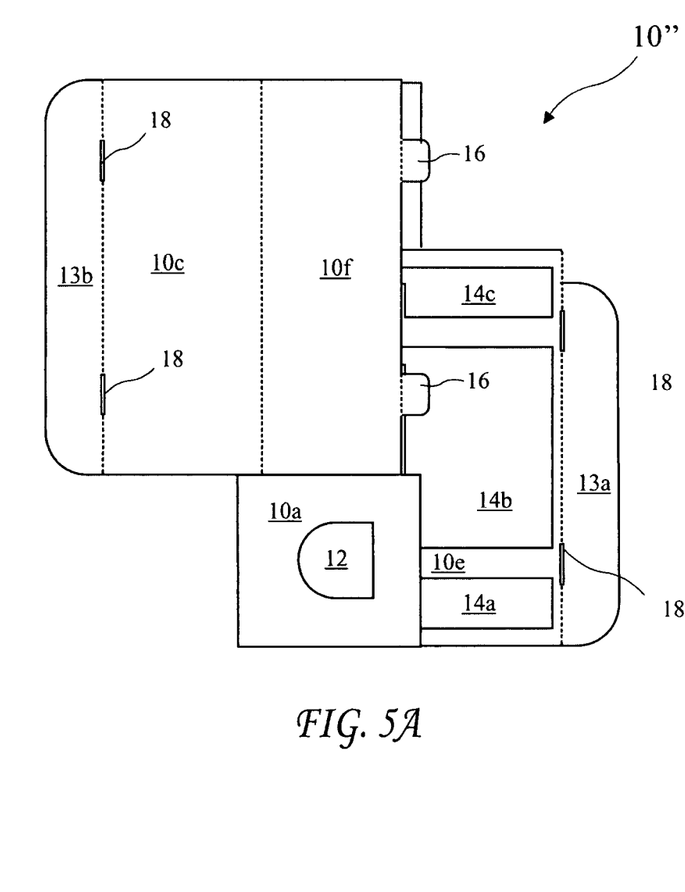
FIG. 5A shows a top view of the low cost disposable container in a flat folded form suitable for retail packaging according to the present invention.
Figure 5B:
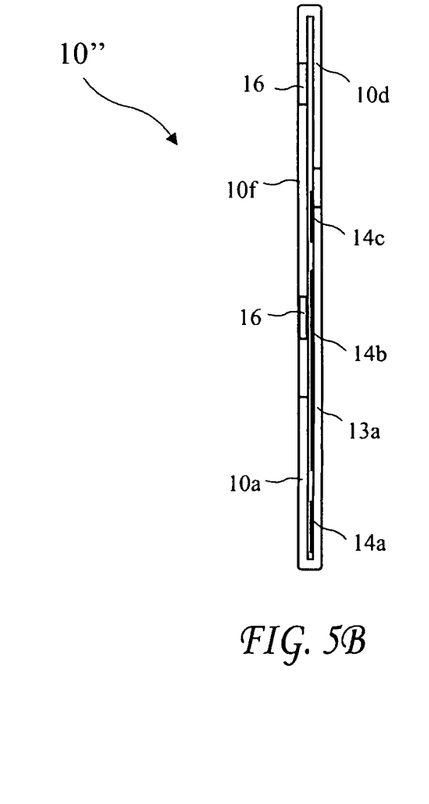
FIG. 5B shows an edge view of the low cost disposable container in the flat folded form suitable for retail packaging according to the present invention.

A top view of the low cost disposable container in a flat folded form 10" suitable for retail packaging, according to the present invention, is shown in FIG. 5A and an edge view of the low cost disposable container in the flat folded form 10" suitable for retail packaging is shown in FIG. 5B. The cutout 10a", 10b", or 10c" is folded to overlap and glue (or otherwise adhere) the bonding tab 20a and a bonding area 20b for bonding to form a closed flat folded form 10".

Figures 6A, 6B:
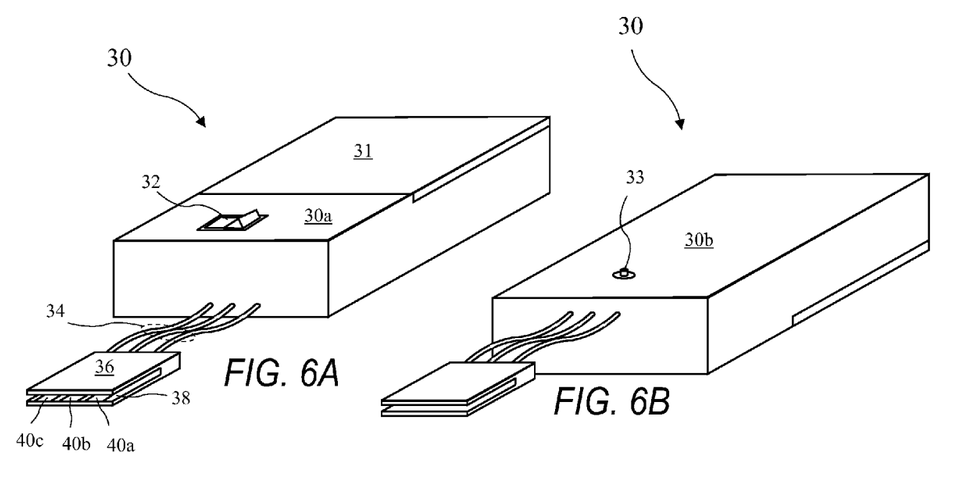
FIG. 6A is a top perspective view of a high voltage, low current, power source with leads and a female connector according to the present invention.
FIG. 6B is a bottom perspective view of the high voltage, low current, power source with leads and a female connector according to the present invention.

A top front perspective view of a high voltage, low current, power source 30 according to the present invention is shown in FIG. 6A and a bottom perspective view of the power source 30 is shown in FIG. 6B. The power source 30 includes an ON/OFF switch 32 on a top surface 30a and a safety switch 33 on a bottom surface 30b. The safety switch 33 is preferably a simple plunger type switch which disables the power supply 30 when the power supply is not lying on a flat surface ready for use. For example, the power supply 30 is disabled when lifted to prevent accidental shocks to a user. Leads 34 and a female connector 36 are connected to the power source 30 for connection to the low cost disposable container 10.

Figure 6C:
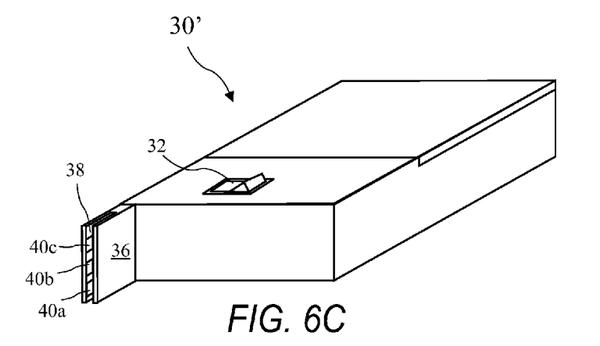
FIG. 6C is a top perspective view of a second high voltage, low current, power source with a female connector attached directly to the power source according to the present invention.

A top perspective view of a second high voltage, low current, power source 30' according to the present invention is shown in FIG. 6C. The female connector 36 attached directly to the power source 30'.

Figure 7A:
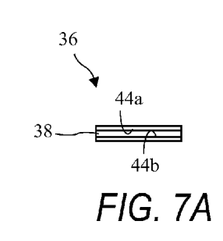
FIG. 7A is a front view of the female connector according to the present invention.
Figure 7B:
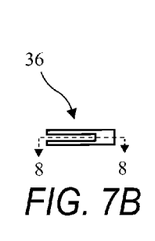
FIG. 7B is a side view of the female connector according to the present invention.
Figure 7C:
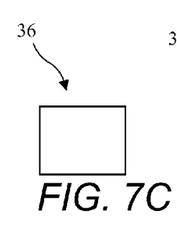
FIG. 7C is a top view of the female connector according to the present invention.

A front view of the female connector 36 according to the present invention is shown in FIG. 7A, a side view of the female connector 36 is shown in FIG. 7B, a top view of the female connector 36 is shown in FIG. 7C, and a cross-sectional view of the female connector 36 taken along line 8-8 of FIG. 7B is shown in FIG. 8. The connector 36 is a split female connector in that the connector contacts 40a, 40b, and 40c reside on a second lip 44b facing a first lip 44a, the lips 44a and 44b are generally parallel and separated by a split(or slot) 38, and thus are not on an exterior surface of the connector 36. The connector 36 is generally inserted into the low cost disposable container 10 through the passage 11 to electrically connect the power source to the low cost disposable container 10.

The connector 36 is called a female connector even though the container 10 is shown with a mouth 11 (see FIG. 2D) for the connector 36 to be inserted into because the electrical contacts 24a-24c reside on an interior surface of the low cost disposable container 10 to prevent or reduce the chance of shocking a user. While such female connector is preferred, a pest electrocution device having a power source with a male connector, for example prongs for insertion into the container 10, is also intended to come within the scope of the present invention.

Figures 9, 10A, 10B, 11:
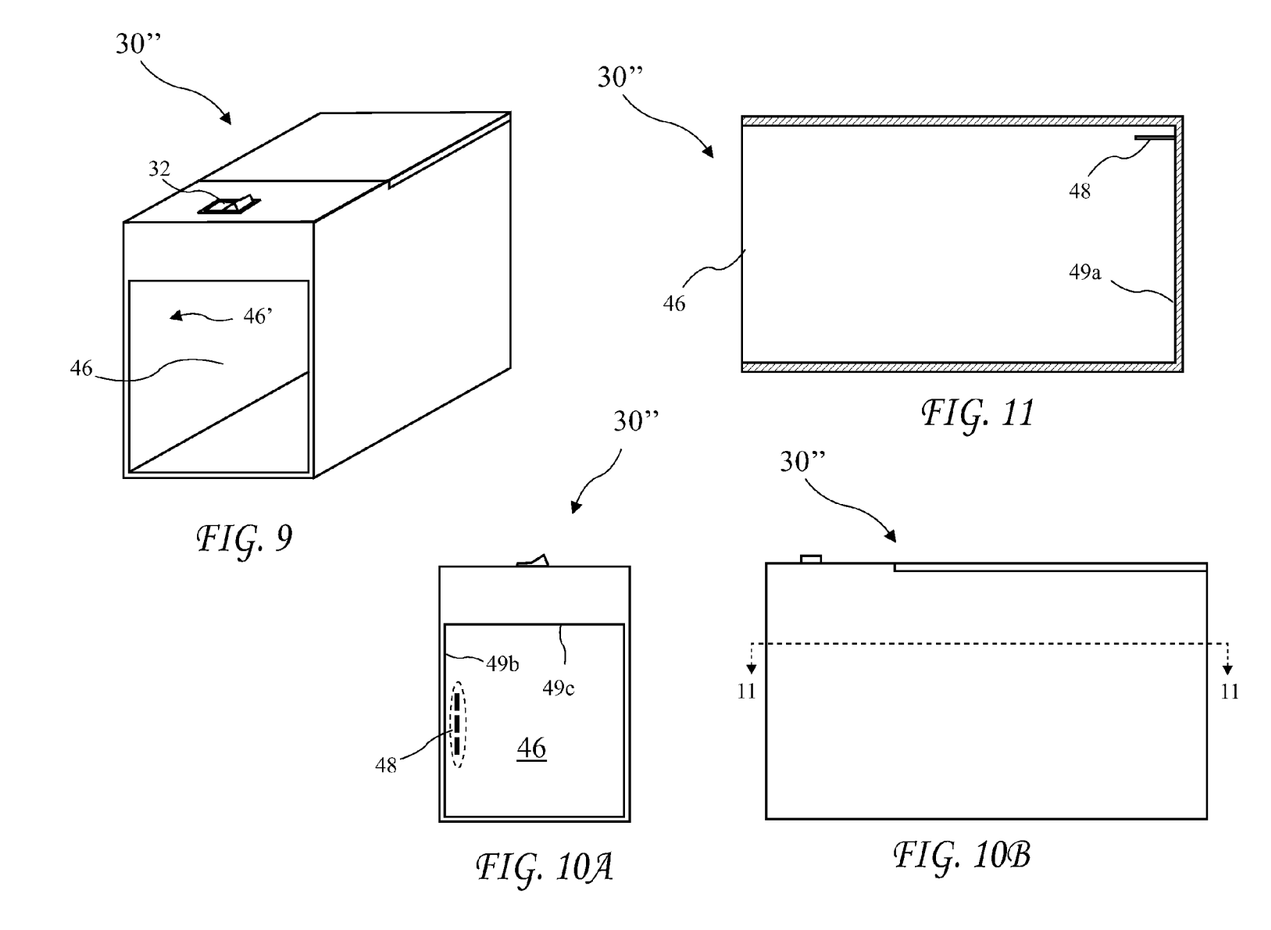
FIG. 9 is a perspective view of a second power source according to the present invention having a mouth for receiving the low cost disposable container.
FIG. 10A is a front view of the second power source.
FIG. 10B is a side view of the second power source.
FIG. 11 is a cross-sectional view of the second power source taking along line 11-11 of FIG. 10B.

A perspective view of a third power source 30" according to the present invention, having a mouth 46 having surfaces 46' including a back 49a, a side 49b, a floor 49d and a roof 49c for receiving the low cost disposable container 10, is shown in FIG. 9, a front view of the third power source 30" is shown in FIG. 10A, a side view of the third power source 30" is shown in FIG. 10B, and a cross-sectional view of the second power source taking along line 11-11 of FIG. 10B is shown in FIG. 11. The mouth 46 allows the low cost disposable container 10 to be inserted into the third power source 30" for use, and to be removed for disposal. Contact 48 reside on or near the back 49a of the interior of the third power source 30" for making electrical contact with the low cost disposable container 10. Alternatively, the low cost disposable container 10 may include male contacts extending from the inserted end of the low cost disposable container 10 for insertion into a female connector inside the third power source 30".

Figure 12:
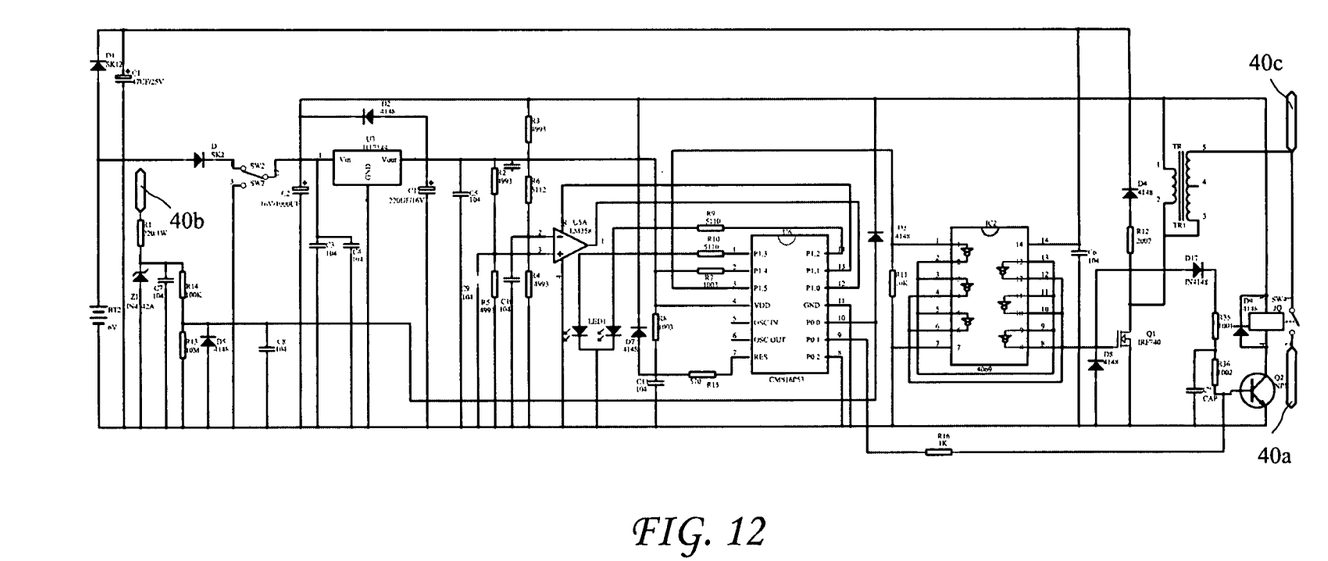
FIG. 12 is a diagram of a circuit providing sensing, and a high voltage and low current signal according to the present invention suitable for use in the power source.

A diagram of a preferred circuit providing sensing and a high voltage and low current signal according to the present invention is shown in FIG. 12. The circuit is suitable for use in the power source, although other circuits, including those discloses in U.S. Pat. Nos. 5,269,091 and 5,949,636 incorporated by reference above, are also suitable. While the power source is preferably battery powered, the power source may also be a plug in power source adapted to plug into a typical wall outlet, for example, 115 or 120 volt AC power. The power source may also be configured to accept either battery or wall outlet power.

While the invention herein disclosed has been described by means of specific embodiments and applications thereof, numerous modifications and variations could be made thereto by those skilled in the art without departing from the scope of the invention set forth in the claims.

I claim:

1. A pest electrocution apparatus comprising:
a reusable power source connectable to a disposable container, the power source providing a high voltage and low current signal for electrocution of pests; a first electrical connector electrically connected to the power source; and a disposable container comprising:
  a floor;
  a right side;
  a left side opposite the right side;
  a rear;
  a connector passage through one of:
    the right side;
    the left side; and
    the rear;
  at least two flat spaced apart conducting areas residing spaced apart on the floor;
  a flat second electrical connector having at least two spaced apart flat electrical contacts and residing adjacent to the connector passage, the second electrical connector laying on at least one of:
    the floor;
    the right side;
    the left side; and
    the rear;
  at least two flat spaced apart electrically conducting paths electrically connecting the two flat conducting areas to the second electrical connector, the electrically conducting paths residing on at least one of:
    the floor;
    the right side;

the left side; and
the rear,
wherein the first electrical connector is removably insertable through the connector passage to make an electrical connection with the second electrical connector; and wherein the first electrical connector and the power source are disconnected from the container, and the container containing the electrocuted pest is disposed of after use.

2. The apparatus of claim 1, wherein the disposable container is made from a plastic product.

3. The apparatus of claim 2, wherein the disposable container is made from a foldable flat plastic product for packaging and foldable into the disposable container for use.

4. The apparatus of claim 1, wherein the disposable container is made from a paper product.

5. The apparatus of claim 4, wherein the disposable container is made from a foldable flat paper product for packaging and foldable into the disposable container for use.

6. The apparatus of claim 4, wherein the spaced apart electrically conducting areas comprise an electrically conducting material deposited onto the floor of the container.

7. The apparatus of claim 6, wherein the second connector comprises spaced apart contacts on an interior surface of the disposable container, the spaced apart electrical contacts comprise an electrically conducting material deposited on the floor of the container.

8. The apparatus of claim 7, wherein the spaced apart contacts, the electrically conducting paths, and the electrically conducting areas are commonly formed by the deposited electrically conducting material.

9. The apparatus of claim 4, wherein the spaced apart electrically conducting areas comprise an electrically conducting material glued on the floor of the container.

10. The apparatus of claim 4, wherein the spaced apart contacts, the electrically conducting paths, and the electrically conducting areas are commonly formed by glued on electrically conducting material.

11. The apparatus of claim 1, wherein the electrically conducting areas are recessed into the disposable container to prevent or reduce the chance of a user touching the electrically conducting areas and being shocked.

12. The apparatus of claim 11, wherein the disposable container has a height of approximately 40 mm and a width of approximately 45 mm to prevent or reduce the chance of a user touching the electrically conducting areas and being shocked.

13. The apparatus of claim 1, further including a safety switch residing on a bottom surface of the power source, the safety switch comprising a plunger type switch which disables the power source when the power source is not lying on a flat surface ready for use.

14. The apparatus of claim 1, wherein the first connector comprises a split connector having a first lip facing a second lip, the second lip carrying contacts and configured for inserting into but not through the connector passage to make an electrical connection with the flat second connector.

15. The apparatus of claim 14, wherein the first lip and the second lip are generally parallel flat surfaces and connect to the disposable container by sandwiching one of the floor, the right side, the left side, and the rear of the disposable container, the contacts residing on the flat second lip thereby providing the electrical connection between the first connector and the second connector.

16. A pest electrocution apparatus comprising:
a reusable power source; and a foldable flat sheet disposable container, having a sheet top surface and comprising:
a floor having a floor top surface;
sides having sides top surfaces;
a rear having a rear top surface;
at least two spaced apart electrically conducting areas on the floor top surface of the foldable flat sheet disposable container;
a passage in one of the sides and the rear;
a flat container connector laying on the sheet top surface of the foldable flat sheet disposable container comprising spaced apart container contacts laying flat on the sheet top surface next to and aligned with the passage when the foldable flat sheet disposable container is folded for use to define a hollow interior, allowing the power source connectable to the foldable flat sheet to be partially inserted into the passage while electrically connecting to the container connector, for electrically connecting the foldable flat sheet disposable container to the power source; and
electrically conducting flat paths on at least one of the floor top surface, the sides top surfaces, and the rear top surface of the foldable flat sheet disposable container reaching from the conducting areas on the floor top surface to the flat container connector,
wherein, the spaced apart electrically conducting areas, the electrically conducting paths, and the container contacts are made by one of depositing and gluing an electrically conducting material on the top surface of the foldable flat sheet disposable container; and wherein the container connector is disconnected from the power source, and the foldable flat sheet disposable container containing the electrocuted pest is disposed of after use.

17. The apparatus of claim 16, further including the power source and a first connector configured for inserting through the passage to make an electrical connection with the flat container connector.

18. The apparatus of claim 17, wherein the first connector comprises a split connector having a first lip facing a second lip, the second lip carrying contacts and configured for inserting through the passage to make an electrical connection with the flat container connector.

19. The apparatus of claim 18, wherein the first lip and the second lip are separated by a uniformly wide gap having about the same thickness as the foldable flat sheet disposable container and electrical contacts of the first connector all reside on a face of the second lip facing the first lip.

20. A pest electrocution apparatus comprising:
a flat sheet, foldable to form a disposable pest container for electrocution and disposal of pests, the flat sheet comprising:
a sheet top surface;
a floor defining a floor top surface portion of the sheet top surface;
two sides defining side top surface portions of the sheet top surface;
a rear defining a rear top surface portion of the sheet top surface;
a top defining a top flat surface portion of the sheet top surface;
at least two spaced apart electrically conducting areas on the floor top surface of the flat sheet;
a connector passage in one of:
the two sides;
the rear; and
the top;

a flat electrical container connector residing on the sheet top surface of the flat sheet, the container connector comprising spaced apart electrical contacts laying flat on an interior surface of the folded container, the electrical contacts next to and aligned with the connector passage when the flat sheet is folded to form the disposable pest container allowing a power source connected to the container to reside partially inside and partially outside the container while electrically connecting to the container connector, an electrical connector for electrically connecting the disposable pest container to a power source; and flat electrically conducting paths on at least one of:
 the floor top surface;
 the sides top surfaces; and
 the rear top surface of the flat sheet,
the electrically conducting paths reaching from the electrically conducting areas on the floor top surface to the container connector,
wherein, the spaced apart electrically conducting areas, the electrically conducting paths, and the container connector, comprise at least one of:
conducting material deposited onto the sheet top surface of the flat sheet; and
conducting material glued onto the sheet top surface of the flat sheet; and wherein the container connector is disconnected from the electrical connector, and the disposable pest container containing the electrocuted pest is disposed of after use.

21. A pest electrocution apparatus comprising:
a reusable power source connectable to a disposable container, the power source providing a high voltage and low current signal for electrocution of pests; a first electrical connector electrically connected to the power source; and a disposable container comprising:
 a floor;
 a right side;
 a left side opposite the right side;
 a rear; and
 a top;
a connector passage through the top and residing along one of the right side, the left side, and the rear of the top of the low cost disposable container;
at least two flat spaced apart conducting areas residing spaced apart on the floor in the interior of the disposable container;
a second electrical connector comprising at least two spaced apart flat electrical contact areas and residing under the connector passage and affixed to one of the right side, the left side, and the rear in the interior of the disposable container; and
at least two flat spaced apart electrically conducting paths electrically connecting the two flat conducting areas to the second electrical connector, the electrically conducting paths affixed to one of the right side, the left side, and the rear in the interior of the disposable container; and
the first electrical connector removably insertable through the connector passage in the top of the disposable container to make an electrical connection with the second electrical connector and to sandwich one of the right side, the left side, and the rear of the disposable container between a first lip residing outside the disposable container and a second lip residing inside the disposable container, the second lip including connector contacts spaced apart to electrically connect with the at least two spaced apart flat electrical contact areas on one of the right side, the left side, and the rear of the disposable container; and wherein the first electrical connector is disconnected from the second electrical connector, and the disposable container containing the electrocuted pest is disposed of after use.

22. The pest electrocution apparatus of claim 21, wherein the disposable container is constructed from a flat sheet material and is collapsable into a flat form for packaging and foldable into a container form for use.

23. A pest electrocution apparatus comprising:
a reusable power source connectable to a disposable holder and low current signal for electrocution of pests and having a mouth;
a first electrical connector electrically connected to the power source and extending forward from a rear surface of the mouth of the power source;
a disposable holder having a floor and configured to insert into and remove from the mouth;
at least two flat spaced apart conducting areas residing spaced apart and fixedly adhered to a top surface of the floor of the disposable holder;
a second electrical connector comprising at least two spaced apart flat electrical contact areas fixedly adhered to the top surface of one end of the floor of the disposable holder; and
at least two flat spaced apart electrically conducting paths electrically connecting the two flat conducting areas to the second electrical connector, the electrically conducting paths fixedly adhered to the top surface of the floor of the disposable holder;
wherein the holder is removably insertable into the mouth wherein the second electrical connector makes an electrical connection with the first electrical connector and sandwiches the floor of the disposable holder between the first electrical connector and the interior of the mouth, the first connector facing the floor of the disposable holder and comprising connector contacts spaced apart to electrically connect with the at least two spaced apart flat electrical contact areas; and wherein the first electrical connector is disconnected from the disposable holder, and the disposable holder containing the electrocuted pest is disposed of after use.

* * * * *